United States Patent [19]

Kawara et al.

[11] Patent Number: 4,494,022
[45] Date of Patent: Jan. 15, 1985

[54] ELECTROMAGNETIC FORCE-TRANSDUCER

[75] Inventors: Toshio Kawara, Kyoto; Yoshihumi Shibahara, Shiga, both of Japan

[73] Assignee: Shimadzu Corporation, Kyoto, Japan

[21] Appl. No.: 592,583

[22] Filed: Mar. 23, 1984

[30] Foreign Application Priority Data

Jun. 10, 1983 [JP] Japan ................... 58-104729

[51] Int. Cl.$^3$ ............ H02K 41/00; G01G 3/14
[52] U.S. Cl. ............................ 310/14; 310/13; 177/210 EM
[58] Field of Search .......... 310/23, 24, 12–15, 310/34, 35; 177/210 R, 210 EM, 212

[56] References Cited

U.S. PATENT DOCUMENTS

| 3,688,854 | 9/1972 | Strobel | 177/210 EM |
| 3,786,678 | 1/1974 | Kunz | 177/210 EM |
| 3,786,883 | 1/1974 | Kunz | 177/210 EM |
| 3,816,776 | 6/1974 | Chari | 310/13 |
| 3,980,908 | 9/1976 | McClintock | 310/14 |
| 4,034,819 | 7/1977 | Akers et al. | 177/210 EM |
| 4,134,468 | 1/1979 | Luchinger et al. | 177/210 EM |

FOREIGN PATENT DOCUMENTS 2076543 12/1981 United Kingdom .

*Primary Examiner*—Mark O. Budd
*Attorney, Agent, or Firm*—Koda and Androlia

[57] ABSTRACT

An electromagnetic force-transducer comprising a magnetic circuit and an electromagnetic coil kept movable in the static field provided by said magnetic circuit. The electromagnetic coil consists of two coaxial parallel windings wound on a common frame with a distance kept between the both. The magnetic circuit comprises an inner magnetic path and an outer magnetic path with a cylindrical clearance left therebetween. In the upper and the lower part of the clearance there are provided with an upper magnetic gap and a lower magnetic gap, respectively. The magnetic field in the upper gap and that in the lower gap are directed oppositely to each other. The coil frame is kept movable vertically in the cylindrical clearance, positioning one of the two windings in the upper magnetic gap and the other in the lower magnetic gap. The two windings are current-supplied in the directions opposite to each other to produce their respective electromagnetic forces in the same direction. Thus, the magnetic fields produced by the two windings are cancelled by each other, so that the resultant magnetic field by the entire electromagnetic coil does not affect the fields provided at the magnetic gaps by the magnetic circuit.

6 Claims, 6 Drawing Figures

ELECTROMAGNETIC FORCE-TRANSDUCER

BACKGROUND OF THE INVENTION

The present invention relates to an electromagnetic force-transducer, and more particularly to an electromagnetic force-transducer suitable for use in an electronic balance.

Electromagnetic force-transducers, particularly those used in electronic balances consist of a magnetic circuit and an electromagnetic coil kept movable in the static-magnetic field provided by said magnetic circuit, said electromagnetic coil being supplied with a current to produce an electromagnetic force. An example of such electromagnetic force-transducers is disclosed in the U.K. patent application GB 2 076 543 A.

FIG. 1 shows a cross-sectional view of a conventional electromagnetic force-transducer. In the figure a permanent magnet 1, a pole piece 2 and a flat-bottomed cylindrical yoke 3 constitute a magnetic circuit. The cylindrical yoke 3 has, on its inner surface, an annular prominence providing a pole piece section 3a which faces the pole piece 2 with an annular magnetic gap left therebetween. In the annular magnetic gap there is positioned an electromagnetic coil 4 wound around a coil frame 5 kept movable in a vertical direction coaxially with the magnet 1, the pole piece 2 and the cylindrical yoke 3. The coil frame 5 is to be provided with a force-transmitting means (not shown in the figure) connected to a force-loading portion (for instance, the weighing tray of an weighing balance) where a force to be balanced is loaded. The electromagnetic coil 4 supplied with a current, produces an electromagnetic force. With the current controlled suitably the electromagnetic force is enabled just to balance a force externally loaded to the coil 4. The magnitude of the electromagnetic force is obtained from measuring the current flowing in the coil 4. Therefore, it is desirable for the electromagnetic force to be exactly proportional to the current. However, the linearity between the current and the produced electromagnetic force is violated by the effect of the magnetic field which the coil 4 itself makes on the permanent magnet 1. A compensating coil 6 wound around the permanent magnet 1 is for cancelling the field made by the coil 4. The compensating coil 6, which does not contribute to the electromagnetic force production at all, is an obstacle to designing the force-transducer to be short in height. Further it makes the electric circuit complex.

On the other hand another type electromagnetic force-transducer is proposed, for instance, in the Japanese Laid-Open Utility Model Application No. 55-164519. In this model the area of the electromagnetic coil plane being divided into two halves bounded by a diameter, two magnetic fields directed oppositely to each other are applied respectively to one of the two halves and to the other half in the direction perpendicular to the coil plane so as to make the coil produce an electromagnetic force with its direction lying in the coil plane. With this manner of field application the effect of the magnetic field made by the electromagnetic coil is cancelled throughout the entire magnetic circuit so as to enable the produced electromagnetic force to be proportional to the current flowing in the coil. The force-transducer of this type, however, has a disadvantage that the effective circumferential length of the electromagnetic coil is reduced by a factor of $2/\pi$.

OBJECTS AND SUMMARY OF THE INVENTION

An object of the present invention is to provide an electromagnetic force-transducer which produces an electromagnetic force proportional to a supplied current without a compensating coil employed.

Another object of the present invention is to provide an electromagnetic force-transducer which can be designed to be short in height.

An additional object of the present invention is to provide an electromagnetic force-transducer which is unlikely to make an error due to temperature variations.

According to this invention an electromagnetic force-transducer, which comprises a magnetic circuit and an electromagnetic coil kept movable in the static-magnetic field provided by the magnetic circuit, has the electromagnetic coil made up of two coaxial windings mechanically connected to each other with a distance kept therebetween in the axial direction, and has the magnetic circuit constituted so as to provide two magnetic fields intersecting the two windings radially in their respective winding planes but in the directions opposite to each other. The two windings, supplied with their respective currents oppositely directed, produce electromagnetic forces in the same coaxial direction.

In such a construction of the invention the electromagnetic coil consisting of the two windings does not have any resultant influence on the static-magnetic field provided by the magnetic circuit, because the fields made by the two windings are oppositely directed to offset each other along the entire magnetic circuit.

BRIEF DESCRIPTION OF THE DRAWINGS

The present invention will further be described in detail with the accompanying drawings, in which.

DETAILED DESCRIPTION OF THE INVENTION

Figure 1:
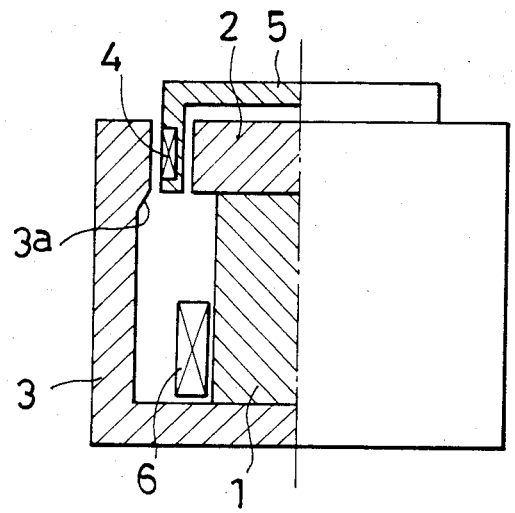
FIG. 1 shows a cross-sectional view of a conventional electromagnetic force-transducer.
Figure 2:
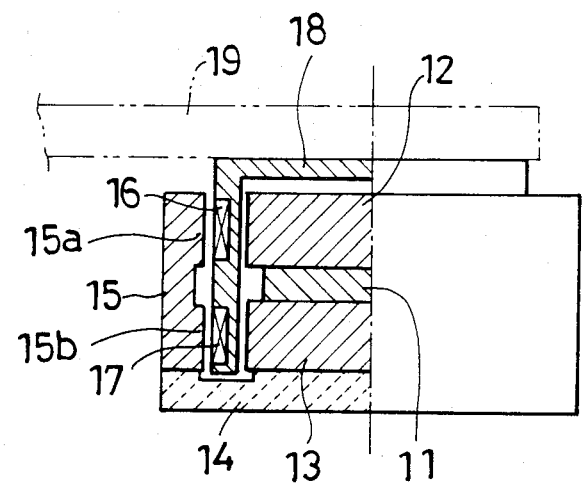
FIG. 2 shows a cross-sectional view of an electromagnetic force-transducer embodying the present invention.

In FIG. 2, which shows an embodiment of the present invention, a disc-shaped permanent magnet 11, an upper and a lower pole piece 12 and 13 fixed respectively to the upper and the lower surface of the magnet 11, and a cylindrical outer magnetic yoke 15 surrounding the magnet 11 and the pole pieces 12, 13 constitute a magnetic circuit. The cylindrical outer yoke 15 has, on its inner surface, two prominences providing two annular magnetic pole piece sections 15a and 15b facing the upper pole piece 12 and the lower pole piece 13, respectively. In the annular magnetic gaps made between the annular pole piece section 15a and the upper pole piece 12 and between the annular pole piece section 15b and the lower pole piece 13, there are respectively positioned a winding 16 and another winding 17, which are wound on a common coil-frame 18 and constitute an entire electromagnetic coil. The coil frame 18 is connected with a force-transmitting means 19 and kept movable in a vertical direction coaxially with the above elements constituting the magnetic circuit. The entire magnetic circuit is fixed on a common support 14 which is made of a non-magnetic material.

Figure 3:
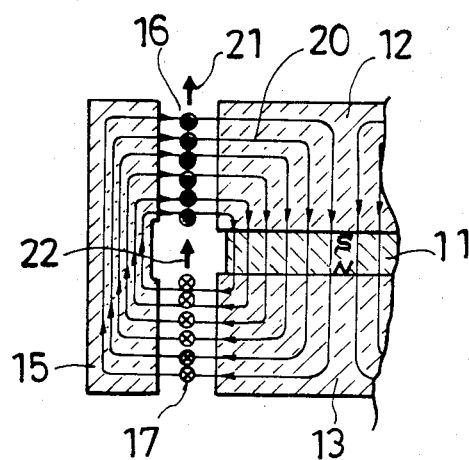
FIG. 3 illustrates a directional relation between the coil current and the static-magnetic field provided by the magnetic circuit in the above embodiment.
Figure 4:
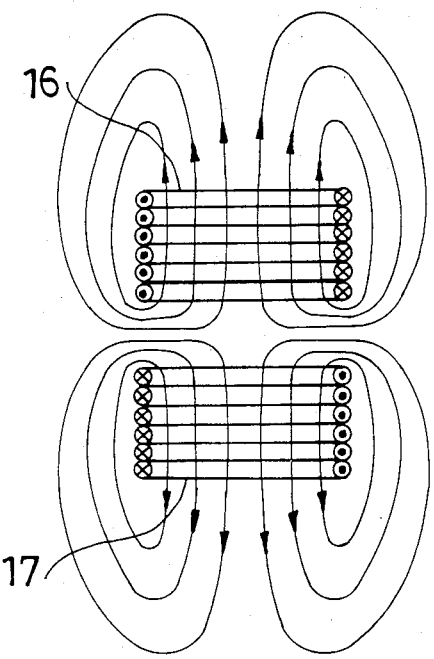
FIG. 4 illustrates the magnetic field made by the electromagnetic coil in the above embodiment.

In such a construction of the electromagnetic force-transducer, the disc-shaped permanent magnet 11 is magnetized downward in the vertical direction, that is, in the thickness direction of the same, so that the static-magnetic flux in the magnetic circuit can schematically be pictured as shown with lines 20 in FIG. 3, intersecting the winding 16 in the direction from outside to inside and the winding 17 in the direction from inside to outside. Therefore, if the windings 16 and 17 are supplied with the currents in the directions shown respectively by dots and crosses, they both produce electromagnetic forces directed upward, as is shown by arrows 21 and 22. The support 14 (not shown in FIG. 3. See FIG. 2) of the magnetic circuit does not affect the symmetric pattern of the static-magnetic flux shown in FIG. 3, because the support 14 is made of a non-magnetic material as is described above. In the present invention, further, the static-magnetic field in the magnetic circuit is not affected by the field which the electromagnetic coil makes thereon, because the two windings 16, 17 constituting the electromagnetic coil are current-supplied in the directions opposite to each other so that the magnetic fields produced by both of the windings 16 and 17 offset each other at the center of the coil. Consequently, the electromagnetic force is always proportional to the current. FIG. 4 illustrates a magnetic flux pattern shown by the electromagnetic coil made up of two windings 16 and 17.

Figure 5:
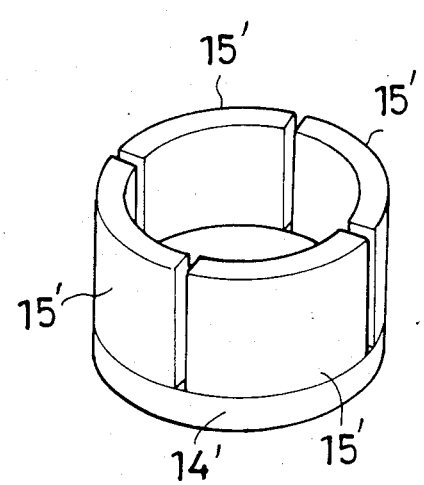
FIG. 5 shows a perspective view of the outer magnetic yoke used in the magnetic circuit in another embodiment of the present invention.
Figure 6:
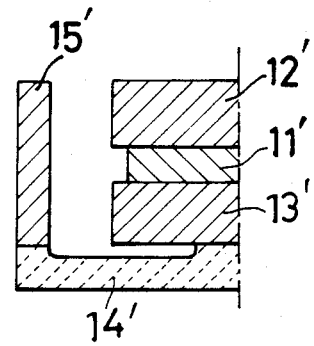
FIG. 6 shows a cross-sectional view of the whole magnetic circuit in which the outer magnetic yoke shown in FIG. 5 is used.

Further, the present invention can be embodied with the cylindrical outer yoke divided into some yoke pieces 15' along generatrices, as is shown in perspective in FIG. 5. The whole magnetic circuit of this embodiment is cross-sectionally shown in FIG. 6, in which reference numbers 11', 12' and 13' respectively indicate a permanent magnet, an outer pole piece and a lower pole piece similar to those used in the embodiment shown in FIG. 2. In this embodiment the magnetic circuit support 14' not only is of non-magnetic material but also has a thermal expansion coefficient smaller than those of the materials used in the magnetic circuit. Such a construction of the magnetic circuit enables a thermal expansion and contraction at the magnetic gaps to be decreased, and therefore, results in decreasing an error due to temperature variations.

Another embodiment of the present invention can be executed by replacing the disc-shaped permanent magnet 11 in the embodiment shown in FIG. 2 with a non-magnetized magnetic material and, at the same time, by constituting the annular pole piece sections 15a and 15b with annular permanent magnets magnetized radially. This embodiment can be further modified by constituting the whole or a part of the cylindrical outer yoke with a cylindrical permanent magnet magnetized in the direction parallel to the cylinder-axis instead of displacing the annular pole piece sections 15a and 15b with the annular permanent magnets.

Further embodiments and modifications are possible without deviating from the spirit of the present invention defined in the claims given hereinafter.

What is claimed is:

1. An electromagnetic force-transducer comprising a magnetic circuit and an electromagnetic coil kept movable in the static-magnetic field provided by said magnetic circuit, and being devised to have said electromagnetic coil produce an electromagnetic force with a current supplied thereto, said magnetic circuit containing a permanent magnet and comprising an inner magnetic path positioned inside said electromagnetic coil and an outer magnetic path surrounding said electromagnetic coil, said electromagnetic coil consisting of two coaxial parallel windings mechanically connected to each other with a distance kept therebetween, and one of said two coaxial parallel windings being supplied with a first magnetic field intersecting the same radially by said magnetic circuit, while the other of said two coaxial parallel windings being supplied with a second magnetic field intersecting the same in the direction anti-parallel to said first magnetic field by said magnetic circuit.

2. An electromagnetic force-transducer defined in claim 1, wherein said permanent magnet is provided in said inner magnetic path.

3. An electromagnetic force-transducer defined in claim 1, wherein said permanent magnet is provided in said outer magnetic path.

4. An electromagnetic force-transducer defined in claim 1, wherein said inner magnetic path and said outer magnetic path are fixed on a non-magnetic supporting means the thermal expansion coefficient of which is smaller than those of the materials constituting said inner and said outer magnetic path.

5. An electromagnetic force-transducer defined in claim 1, wherein said magnetic circuit comprises:
a plate-shaped permanent magnet magnetized in the thickness direction of the same;
an upper pole piece fixed to the upper surface of said plate-shaped permanent magnet;
a lower pole piece fixed to the lower surface of said plate-shaped permanent magnet; and
a cylindrical magnetic yoke coaxially surrounding said plate-shaped permanent magnet, said upper pole piece and said lower pole piece, keeping an upper clearance and a lower clearance respectively around said upper pole piece and around said lower pole piece, and being mechanically connected to the lower surface of said lower pole piece through a support made of a non-magnetic material.

6. An electromagnetic force-transducer defined in claim 1, wherein said magnetic circuit comprises:
a plate-shaped permanent magnet magnetized in the thickness direction of the same;
an upper pole piece fixed to the upper surface of said plate-shaped permanent magnet;
a lower pole piece fixed to the lower surface of said plate-shaped permanent magnet; and
a cylindrical magnetic yoke divided along its generatrices into a plurality of yoke-pieces, surrounding coaxially and plate-shaped permanent magnet, said upper pole piece and said lower pole piece, keeping an upper clearance and a lower clearance respectively around said upper pole piece and around said lower pole piece, and being mechanically connected to the lower surface of said lower pole piece through a support made of a non-magnetic material the thermal expansion coefficient of which is smaller than those of the materials constituting said magnetic circuit.

* * * * *